(12) United States Patent
de Heer et al.

(10) Patent No.: US 7,392,520 B2
(45) Date of Patent: Jun. 24, 2008

(54) METHOD AND APPARATUS FOR UPGRADING SOFTWARE IN NETWORK BRIDGES

(75) Inventors: Arie Johannes de Heer, Hengelo (NL); Gert H. Manhoudt, Hilversum (NL); Erik Tromp, Bergen (NL); Siebe Warners, Utrecht (NL)

(73) Assignee: Lucent Technologies Inc., Murray Hill, NJ (US)

(*) Notice: Subject to any disclaimer, the term of this patent is extended or adjusted under 35 U.S.C. 154(b) by 754 days.

(21) Appl. No.: 10/789,966

(22) Filed: Feb. 27, 2004

(65) Prior Publication Data

US 2005/0193385 A1 Sep. 1, 2005

(51) Int. Cl.
*G06F 9/45* (2006.01)
*G06F 15/177* (2006.01)
*H04L 12/28* (2006.01)
*H04B 3/20* (2006.01)

(52) U.S. Cl. .................. 717/171; 709/221; 370/254; 370/287; 370/400

(58) Field of Classification Search ............... 717/168, 717/172, 173, 171; 709/221; 370/254, 287, 370/400
See application file for complete search history.

(56) References Cited

U.S. PATENT DOCUMENTS

| | | | | |
|---|---|---|---|---|
| 6,515,969 | B1* | 2/2003 | Smith | 370/256 |
| 6,691,300 | B1* | 2/2004 | Alexander et al. | 717/113 |
| 6,785,294 | B1* | 8/2004 | Ammitzbøll et al. | 370/467 |
| 6,813,250 | B1* | 11/2004 | Fine et al. | 370/256 |
| 2005/0080912 | A1* | 4/2005 | Finn | 709/230 |

OTHER PUBLICATIONS

The Simple Times, V9, No. 1, Dec. 2001, p. 1-30, URL <http://www.simple-times.org/pub/simple-times/issues/9-1.html> retrieved from google.com May 14, 2007.*
Achtari, Guyves; "EGVRP: A proposal to extend GVRP", 2004, retrieved from google.com May 14, 2007.*
Finn, Norman; "Compact GVRP", p. 1-8, Cisco Systems, Inc, Nov. 2003, retrieved from google.com May 14, 2007.*
ANSI/IEEE Std 802.1D, 1998 Edition,1998, p. v-xix, 147-153, 171-175, 192, 199, 343-345, retrieved from google.com May 14, 2007.*
Part 3: Media Access Control (MAC) Bridges—Amendment 2: Rapid Reconfiguration, IEEE Std. 802.1w-2001 (Amendment to IEEE Std. 802.1D, 1998 Edition (ISO/IEC 15802-3:1998) and IEEE Std. 8802.1t-2001], IEEE, 2001; pp. i-108.

(Continued)

*Primary Examiner*—Mary Steelman (57) ABSTRACT

Method for upgrading software in a network bridge that is part of a VLAN includes sending notification to other bridges of the VLAN that the bridge is scheduled for upgrading; suspending VLAN registration and membership information in the other bridges while upgrading the bridge; restoring a state of the updated bridge and sending notification to the other bridges that the upgrading has been completed. As a result of the notification, the other bridges do not expect additional messages from the upgrading bridge. The step of restoring a state of the bridge includes synchronizing a GVRP protocol running within the network to a current VLAN membership table. Apparatus includes a forwarding plane adapted to store VLAN membership information and a control plane adapted for issuing and executing instructions that control registration and de-registration of one or more ports of the bridge according to the VLAN membership information and the presented method.

28 Claims, 5 Drawing Sheets

OTHER PUBLICATIONS

IEEE Standards for Local and Metropolitan Area Networks; Virtual Bridged Local Area Neworks; IEEE Std. 802.1Q, 2003 Edition [incorporates IEEE Std. 802.1Q-1998, IEEE Std. 802.1u-2001, IEEE Std. 802-1v-2001, and IEEE Std 802.1s-2002]; May 7, 2003, pp. 1-212.

IEEE Standards for Local and Metropolitan Area Networks: Virtual Bridged Local Area Networks; IEE Std. 801.8Q-1998.

"Using GVRP (Dynamic VLANs)", Hewlett-Packard Company, 2000.

* cited by examiner

METHOD AND APPARATUS FOR UPGRADING SOFTWARE IN NETWORK BRIDGES

FIELD OF INVENTION

The invention relates to the field of switched networks and, more specifically, to the management of traffic flow in Virtual Local Area Networks within such switched networks.

BACKGROUND OF INVENTION

A Local Area Network (LAN) is generally defined as a broadcast domain. All nodes in a network connected to the same LAN communicate directly with each other, whereas two nodes connected to different LANs require a router to communicate. A LAN may consist of a single physical segment, or several segments interconnected by hubs, bridges or switches. A Bridged LAN (BLAN) consists of LAN segments interconnected by bridges. As data moves through a BLAN there may be multiple paths the data may take to arrive at the same destination. To avoid the problem of loops being created in a BLAN, bridges execute one of various protocols that determine which ports (points of physical access) of a bridge should be used for accepting data frames and which ports should be blocked. One such protocol is a Spanning Tree Protocol (STP) which is explained in detail in IEEE 802.1D-1998 and herein incorporated in its entirety by reference. The STP determines for each port of a bridge whether such port should be placed in a blocking mode, where no data frames are accepted or sent by the port, or placed in a forwarding mode, where data frames may be sent and received by said port. The broadcast domain for a BLAN is the entire spanning tree. In other words, whenever a frame of data is sent to an unknown address, the frame will be sent out on every LAN segment and received at all end nodes in the spanning tree.

A single BLAN can support several logical LANs, or Virtual LANs (VLANs). A VLAN consists of a subset of the BLAN. Associated with each VLAN is a VLAN ID (VID). A Virtual Bridged LAN (VBLAN), is a BLAN that allows for the definition, creation and maintenance of VLANs. A bridge that performs the necessary functions is a VLAN-aware bridge. VBLANs consist of interconnected VLAN-aware bridges. Nodes may send and receive frames associated with different VLANs; each frame that is exchanged via a VBLAN is associated to a single VLAN.

Figure 1:
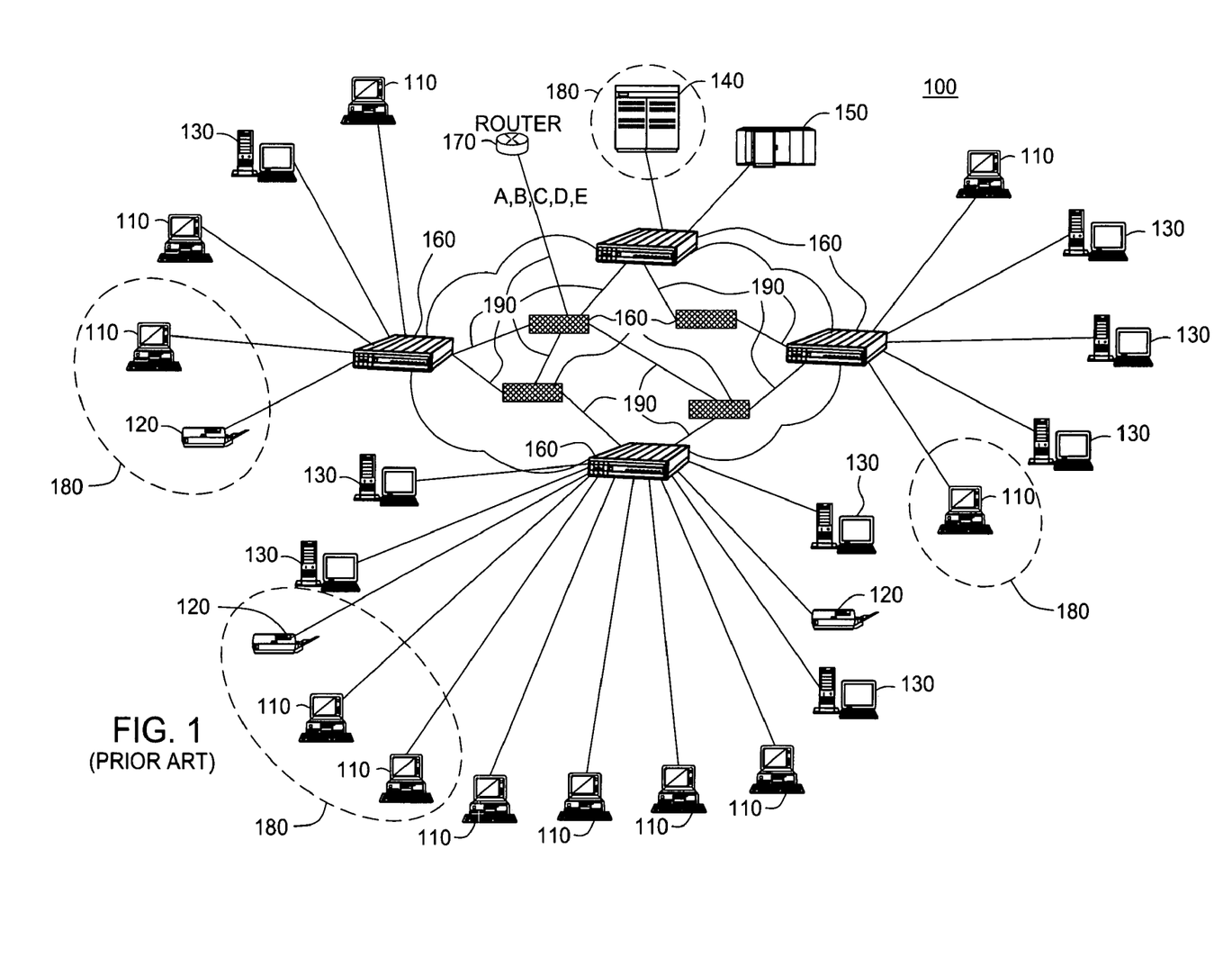
FIG. 1 depicts a Bridged Local Area Network having at least one Virtual Local Area Network in accordance with the prior art.

FIG. 1 depicts a typical VBLAN 100 associated with the prior art. The VBLAN 100 includes a plurality of user computer stations 110, printers 120, personal computers 130 and one or more network host computers 140 and 150. Messages, frames and data within the VBLAN 100 are passed from one network device to another via a series of bridges 160 and interconnecting links 190. End devices (such as user computer stations 110, printers 120 and the like) can be grouped into a VLAN 180 (the subset denoted by dashed line circles) for accessing minicomputer 140. Using this VLAN 180, devices are grouped logically into a single broadcast domain. Accordingly, broadcast traffic is confined to just those devices that need to see it, thereby reducing traffic to the rest of the network. All devices that exchange frames via a certain VLAN are said to be members of that VLAN.

For a BLAN, the broadcast domain consists of the entire spanning tree. The broadcast domain of a VLAN is reduced to a subset of the entire spanning tree. Such a revised broadcast domain is realized by means of limiting the VLAN membership of ports on the bridges 160. Frames belonging to a certain VLAN are only exchanged via ports that are configured to be members of that VLAN. This configuration can be static or dynamic. Dynamic configuration is achieved by using the GARP VLAN Registration Protocol (GVRP). GVRP is an application of the Generic Attribute Registration Protocol (GARP). GARP is defined in IEEE 802.1D-1998 and GVRP is defined in IEEE 802.1Q-2003 both of which are incorporated in their entirety by reference. By using GVRP, VLAN-aware bridges register and propagate VLAN memberships on all ports that are part of the active topology of the underlying spanning tree(s). For example, a frame from VLAN 180 received on a port which is a member of VLAN 180 is only forwarded on ports which are members of the same VLAN 180.

It is understood that in a sophisticated interconnection of various network devices to create VLANs, it is sometimes required to upgrade the software on a bridge to provide the best possible operating conditions within the network. Currently, upgrading of a bridge results in that bridge not sending out messages in accordance with GARP AND GARP applications (e.g., GVRP). Additionally, such bridge will not respond to such messages from neighboring bridges. Consequently, if a bridge is running the GARP application GVRP, connectivity for the VLAN is lost and the traffic from end-users is affected.

SUMMARY OF THE INVENTION

The disadvantages heretofore associated with the prior art are overcome by a novel method and apparatus for upgrading the software in a first bridge operating in a first state in a network containing a plurality of bridges wherein the first bridge and one or more of the second bridges form part of a VLAN. The method includes the steps of sending notification to one or more second bridges that the first bridge is scheduled for upgrading thereby disturbing the first state of operation; suspending VLAN registration information in the one or more second bridges while upgrading the first bridge; restoring the first state of the first bridge and sending notification to the one or more second bridges of the network that the upgrading of the first bridge has been completed. The step of sending notification may include sending a special GVRP message. As a result of the notification, the one or more second bridges do not expect additional messages from the first bridge. The step of restoring the first state of the first bridge includes synchronizing a GVRP protocol running within the network to a current VLAN registration table. The step of sending notification to one or more second bridges that the upgrading of the first bridge has been completed includes sending a normal GVRP message to one or more frozen ports of said one or more second bridges. In one embodiment, the method is practiced by a computer readable medium containing a program which, when executed, performs an operation of upgrading the GVRP in the first bridge in the network in accordance with the above-presented steps.

The invention also includes an apparatus for upgrading a GVRP protocol in a network bridge in a plurality of interconnected network bridges. The apparatus includes a forwarding plane adapted to store VLAN membership information and a control plane adapted for issuing and executing instructions that control upgrading of the network bridge including sending notification to one or more second bridges that the first bridge is scheduled for upgrading, suspending VLAN membership information in the one or more second bridges while upgrading the first bridge, restoring a state of the first bridge prior to it being upgraded and sending notification to the one or more second bridges of the network that the upgrading of the first bridge has been completed. Accordingly, the invention provides for a bridge that is GVRP upgraded and then capable of being re-introduced into the network as an active component therein without unnecessarily disturbing the VLAN membership registration or otherwise causing the network to reconfigure itself to account for a loss of connectivity to the first bridge.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The subject invention provides a method for upgrading bridges in a VBLAN as well as an apparatus operating in accordance with the method steps. The apparatus is an enhanced bridge. Both the method and apparatus provide for the upgrading of software in the bridge and re-establishing the GARP and GARP application messaging in the bridge. The invention is presented within the context of an Ethernet based network with bridges operating in accordance with one particular application of GARP known as GVRP; however, the invention can be practiced in any suitable context or network that can support the discussed protocols. Alternate protocols (i.e., GMRP and the like) that are other applications of GARP can be substituted for GVRP. Accordingly, the apparatus may be used in an exemplary telecommunications system or network such as the BLAN 400 described in FIG. 4. For sake of clarity, BLAN 400 is similar in design, construction and purpose as BLAN 100 of FIG. 1 except where discussed otherwise below.

Figure 2:
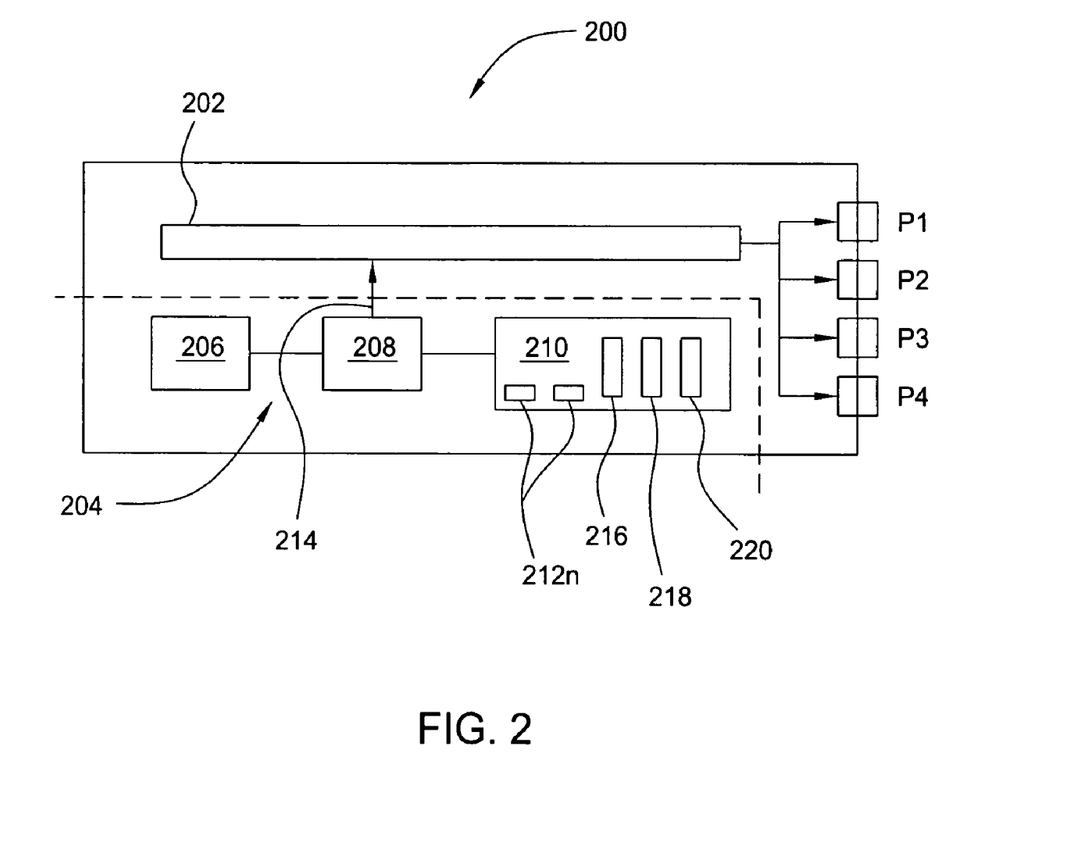
FIG. 2 depicts a bridge component for a VLAN in accordance with the subject invention.

FIG. 2 depicts an exemplary enhanced bridge 200 in accordance with the subject invention. The enhanced bridge replaces bridges 160, of FIG. 1 in the BLAN 400 of FIG. 4. The enhanced bridge 200 comprises a plurality of ports P1, P2 . . . Pn for receiving and sending data. In one embodiment, four ports P1-P4 are depicted, but one skilled in the art will understand any number of ports is possible based on known design and fabrication techniques and network configuration.

In VBLANs, two types of registration are defined to register the membership of the ports on a node (e.g., end-device or bridge) to a certain VLAN, Static and Dynamic. In general, a port has to be a member of a VLAN if members belonging to that VLAN are reachable via that port. Static membership registration of VLANs at a port is defined by action of the network manager or other authorized operator. The Static registration for a VLAN is performed on ports connected to segments with end-nodes having a fixed VLAN membership. For example, and in one embodiment of the invention, a first end-node $110_1$, and a second end-node $110_2$ of a first VLAN 180 in FIG. 4 have VLAN membership that is registered statically (i.e., by a network manager). The Dynamic registration is used to interconnect bridges with ports having statically configured membership. Dynamic membership registration is configured automatically by means of the GVRP protocol. GVRP allows a node to make or withdraw declarations of VLANs at LAN segments. These declarations and withdrawals result in the registration and de-registration at the other nodes participating in GVRP.

More specifically, and according to GVRP protocol, a VLAN declaration for a port is recorded by an Applicant state machine 216 associated with the VLAN and port. A VLAN registration for a port is recorded by a Registrar state machine 218 associated with the VLAN and port. A node declares a VLAN on a certain LAN segment by means of sending a "Join" message for that VLAN. A node withdraws a declaration by sending a "Leave" message for that VLAN. A state change in the Applicant state machine 216 triggers the sending of these messages. The receipt of these messages may result in changes to the state of the Registrar state machine 218 and Applicant state machine 216. In general, if a "Join" message for a VLAN is received on a port, the receiving port will become a member of that VLAN; if a "Leave" message for a VLAN is received on a port, the port will withdraw the VLAN membership for that port, unless a "Join" message is received on the port for that VLAN within a predetermined period of time. Typically this predetermined period of time is 0.6 seconds. In general for exchanging frames belonging to a certain VLAN over a certain LAN segment, at least two nodes need to have declared and registered the VLAN.

Further associated with each port participating in GVRP is a Leave All state machine 220. This state machine governs the regular exchange of Leave All messages. On receipt of a "Leave All" message, the receiving port will de-register all VLAN memberships for that port, except for the VLANs for which a "Join" message is received within a predetermined period of time after the receipt of the "Leave All" message. Typically this predetermined period of time is 0.6 seconds.

If a bridge has registered the membership of a VLAN at a port (either Static or Dynamic), that VLAN should be declared at all LAN segments connected to the other active ports. This is governed by the Applicant state machine 216 and will result in sending out of "Join" message(s) on the ports connected to segments where not all other nodes connected to it have registered the membership to this VLAN.

Registration of VLAN membership information for a certain VLAN is removed as the result of the receipt of a "Leave" message for that VLAN or the receipt of a "Leave All" message. In both cases, the Registrar state machine 218 will wait for a predetermined period of time (typically 0.6 seconds) after the receipt of the message, before actually removing the membership registration.

Returning to FIG. 2, the enhanced bridge 200 further comprises a forwarding plane section 202 which is responsible for forwarding frames of data (messages), learning Media Access Control (MAC) addresses, storing the VLAN membership information (e.g., table) for each port and the like, and physically controls the states of ports (P1-P4) associated with the enhanced bridge component 200. An example of forwarding plane hardware and control mechanisms may be found in the AM1 SDH Multiplexer device manufactured and sold by Lucent Technologies of Murray Hill, N.J. The enhanced bridge 200 also includes a control plane 204 for issuing and executing software instructions that control the forwarding plane 202. The control plane 204 comprises a central processing unit (CPU) 208, support circuits 206, and memory 210. The CPU 208 may comprise one or more conventionally available microprocessors. The support circuits 206 are well known circuits that comprise power supplies, clocks, input/output interface circuitry and the like. Memory 210 may comprise random access memory, read only memory, removable disk memory, flash memory and various combinations of these types of memory.

The memory 210 of each enhanced bridge 200 stores, among other things, the states of the various state machines (i.e., Applicant 216, Registrar 218 and Leave All 220) involved in the GVRP protocol. The memory 210 also stores various software packages $212_n$ that dictate enhanced bridge 200 functionality and operation including, but not limited to, assignment of port status, registering, deregistering and maintaining VLAN membership of the ports and upgrading bridge programming in accordance with the subject invention. As such, the enhanced bridge 200 becomes a special purpose machine when executing the steps of upgrading in accordance with the subject invention described in detail below.

The CPU 208 interfaces with the control plane 204 via one or more buses or connections 214. When one or more of the software packages $212_n$ is executed, the control plane 204 is responsible for handling VLAN membership registration and deregistration for the plurality of ports P1-P4. For example, the control plane 204 is ultimately responsible for maintaining the VLAN membership table and GVRP state machines and subsequently restoring the membership table and GVRP state machines after a GVRP update has been made to the bridge.

Accordingly, execution of one or more of the software packages $212_n$ generates signals in the control plane 204 that are provided via the bus 214 to the forwarding plane 202. Consequently, forwarding plane 202 acts upon the appropriate ports P1-P4 to maintain their appropriate VLAN membership registration based upon the program instructions. Note that the control plane 204 handles the registration and de-registration, but the membership information is stored in the forwarding plane 202 as well. This is necessary because the membership information is taken into account when forwarding frames.

Figure 3:
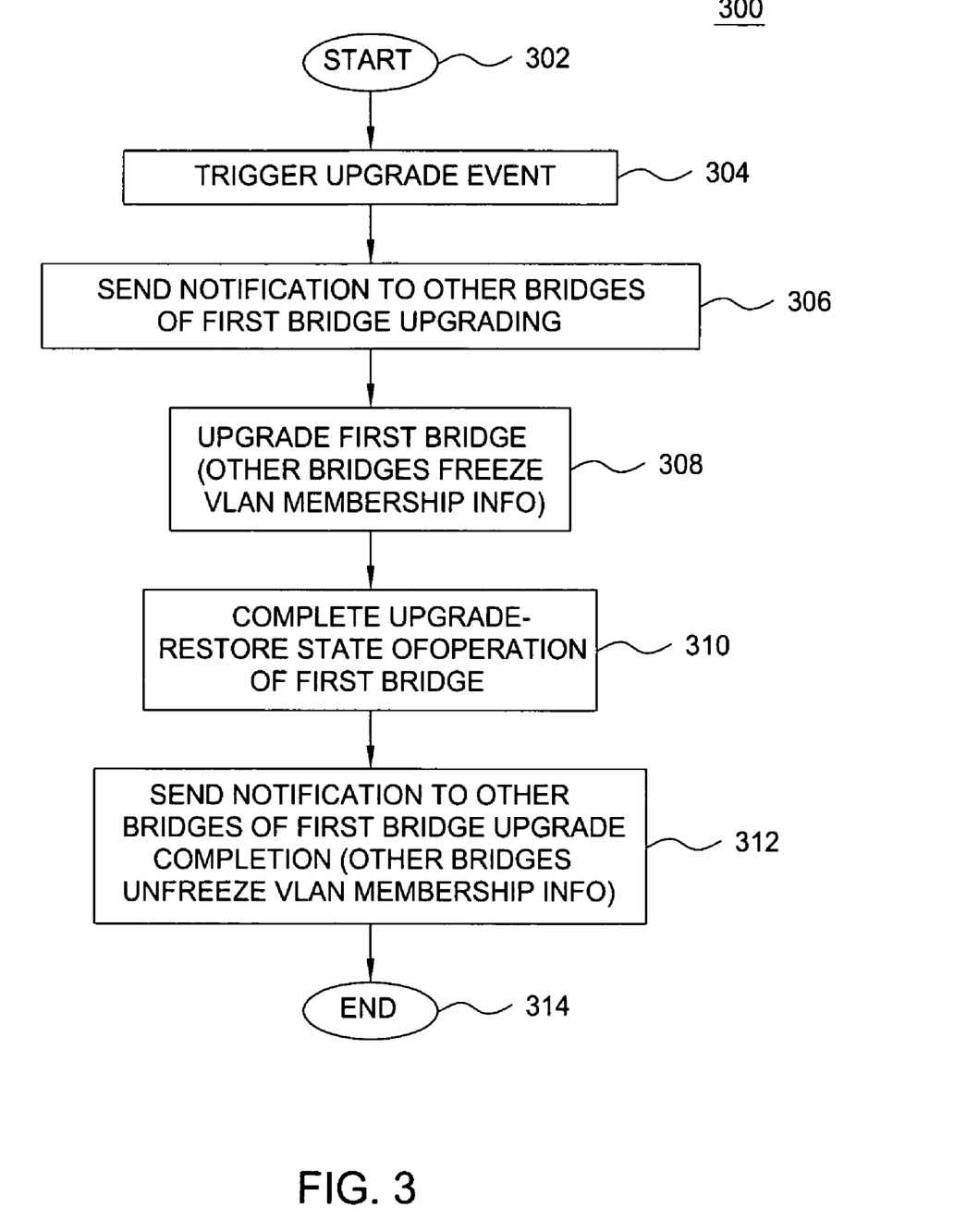
FIG. 3 depicts a series of method steps for upgrading the GVRP in a bridge component in accordance with the subject invention.
Figure 4:
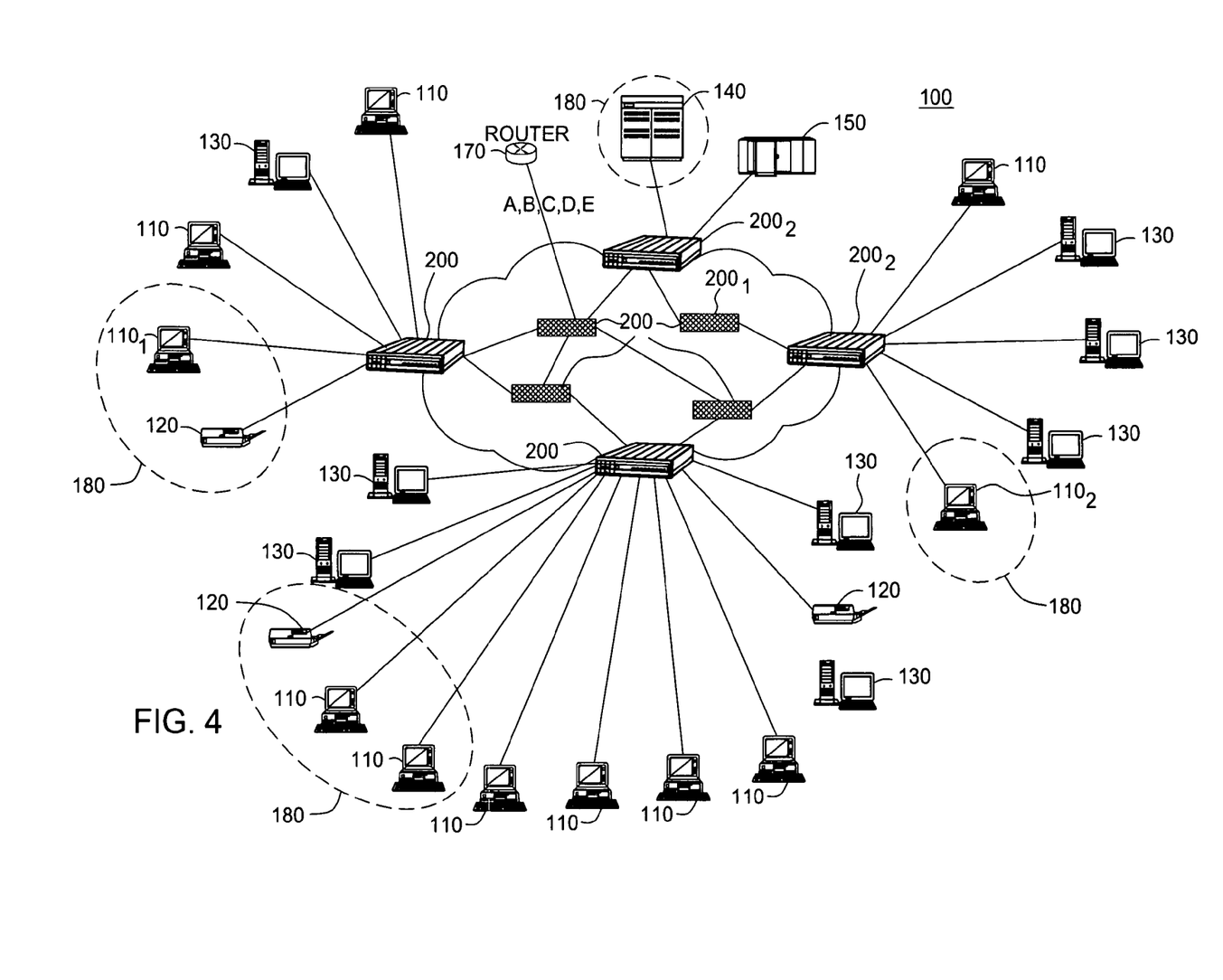
FIG. 4 depicts a Bridged Local Area Network having at least one Virtual Local Area Network in accordance with the subject invention.

FIG. 3 depicts a series of method steps 300 for upgrading a switched network interconnection device such as a bridge (i.e., a first bridge) in accordance with the subject invention. For the purposes of this discussion, first bridge of the method may be enhanced bridge 200 described above operating in a first state on network 400 or other similar network having multiple bridges constructed and operating in the same manner as enhanced bridge 200.

The method starts at step 302 and proceeds to step 304 whereby an upgrading event is triggered in the network. Specifically, and in one embodiment of the invention, a network manager sends a trigger message to the first bridge that the first bridge is scheduled for a GVRP messaging upgrade. A trigger event can be sent in general when the bridge has to be rebooted without affecting the forwarding plane, e.g., in case of failures of other parts of the bridge. The method proceeds to step 306 whereby notification is sent to one or more second bridges associated with the first bridge to be upgraded. For example, and in one embodiment of the invention, a first bridge 200, of FIG. 4 receives the trigger message and subsequently sends notification to neighboring bridges $200_2$. The content of the notification can be, for example, a GVRP message according to the IEEE 802.1Q-1998 standard. More specifically, GVRP messages, as defined in the standard, contain attribute events encoded as numbers. Some numbers have a defined meaning, while others are presently undefined. Such undefined meanings are therefore customizable. In one example, the presented notification message can contain an attribute event that is customizable by the 802.1D-1998 standard. The act of sending notification disturbs the first state of operation of the first bridge. That is, normal spanning tree protocol and VLAN registration protocol operations are no longer performed by the first bridge.

The method proceeds to step 308 wherein the actual upgrading of the first bridge is accomplished. For example, new software updates regarding GVRP messaging are integrated into one or more of the programs 212 or memory 210 of the first bridge based on instructions received from other portions of the network to which the first bridge is connected (in one example BLN 400). Included within this upgrading step of the first bridge is also a freezing of information in the other bridges $200_2$. Specifically, VLAN registration and membership information for the port connected to the same segment as the upgrading node contained in the neighboring bridges is frozen so that VLAN membership for this port is not removed during the upgrading process. More specifically, a dynamic VLAN membership registration and deregistration is based on the exchange of GVRP frames. The upgrading bridge cannot participate in the exchange of these messages and can furthermore not update its registered membership information according to the exchanged messages. Therefore, exchanging GVRP messages over a segment that is connected to an upgrading bridge may result in an inconsistent state. During the upgrade, the neighboring bridges should not remove any VLAN membership registration information. To accomplish this, during the upgrade, the "Leave All" timers for the ports connected to the same segments as the upgrading bridge do not expire. Furthermore, the predetermined period a port normally waits before removing a VLAN membership registration after receiving or sending a "Leave (All)" message starts after the upgrade is completed. By second bridges $200_2$ freezing VLAN membership information, it allows the first bridge to be updated while maintaining the subset of the VBLAN topology for this VLAN.

At step 310, the upgrading of the first bridge is completed and the protocol that was being used to provide VLAN registration information of ports on the first bridge is restored. For each port and for all VLANs that are registered dynamically, at the first bridge, the state of the GVRP protocol has to be restored. This restoration is based on the VLAN membership state as preserved during the upgrade in the forwarding plane. If a port is a member of a VLAN (i.e., VLAN 180 of FIG. 4), the VLAN membership is registered for that port, otherwise it is not registered. More specifically, if a port is a member of a VLAN, the state of the associated Registrar state machine is set to the In (IN) state. If the port is not a member of a VLAN, the state of the associated Registrar state is set to the MT (empty) state. The state of the Applicant state machine associated to a certain port for a particular VLAN is determined by the restored state of the Registrar state machines for that VLAN at the other ports. If none of the states of the Registrar state machines associated to the other ports for that VLAN equals the IN state, the state of the Applicant state machine of the first port is set to Very Anxious Observer (VO), and Vary Anxious Active Member (VA) otherwise. Note that all the presented states are precisely defined in IEEE 802.1D-1998.

At step 312 after the first bridge has been updated and the GVRP protocol has been restored, first bridge is prepared to begin sending GVRP messages again. Accordingly, first bridge sends notification to other bridges in the network (more specifically neighboring bridges $200_2$ in network 400) that the first bridge upgrading has been completed. In response to the notification, second bridges unfreeze the VLAN membership information that was frozen in step 308 and normal functioning of the second bridges commences. It will be understood and appreciated that the series of method steps described herein with respect to FIG. 3 can be properly written as instruction code in one or more of the software packages $212_n$ or as ASIC contained within memory 210 of bridge 200. As such, it is understood that the present invention provides a method to upgrade software of a bridge and reestablish the protocols in effect to operate the bridge. So long as the update does not require changes to the forwarding plane 202 (i.e., physical changes to the hardware associated therewith). The method updates software contained within the control plane 204 without affecting the forwarding plane 202.

Figure 5:
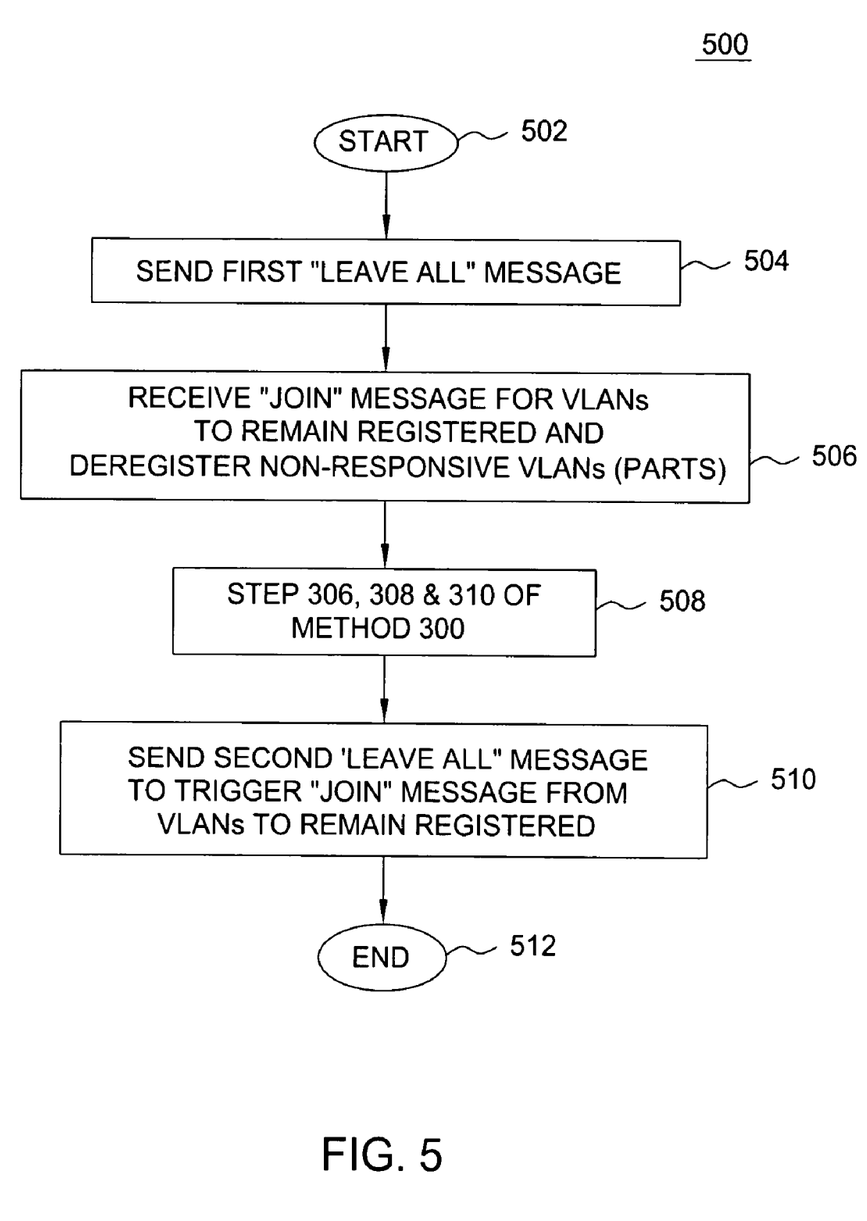
FIG. 5 depicts a series of method steps for upgrading a switched network connection device such as a bridge in accordance with an additional embodiment of the subject invention.

FIG. 5 depicts a series of method steps 500 for upgrading a switched network connection device such as a bridge in accordance with an additional embodiment of the subject invention. Specifically, the method starts at step 502 and proceeds to step 504 where a first "Leave All" message is sent from the device being upgraded (a first network bridge, enhanced bridge 200) operating in a first state on network 400 or other similar network as previously described. This action by the first bridge suspends the sending of "Leave All" messages from neighboring bridges for a standard recommended value (i.e., at least 10 seconds). At step 506, the first bridge waits for the end of the predetermined period for removing VLANs that were registered that have not subsequently sent "Join" messages in response thereto and removes or deregisters such VLANs from the appropriate ports of the bridge. By performing these pre-upgrade steps, the most recent and accurate registration information for the first bridge is obtained.

At step 508, the method executes, in succession, steps 306, 308, and 310 of method 300 described above. That is, the specific steps of sending notification, upgrading first bridge and restoring the state of operation of the first bridge are executed in a manner identical to that described above. At step 510, first bridge sends a second "Leave All" message. After processing the "Leave All" message and the resulting messages, the most recent and accurate registration information for the first bridge is obtained. This particular embodiment of the subject invention is adequate for unmodified neighboring bridges as long as there are no VLANs which are added or removed to/from the network 400 during the upgrade period.

Although various embodiments that incorporate the teachings of the present invention have been shown and described in detail herein, those skilled in the art can readily devise many other varied embodiments that still incorporate these teachings.

What is claimed is:

1. A method for upgrading software in a control plane, comprising:
   a) sending notification to one or more second bridges that a first bridge is scheduled for a control plane software upgrade thereby disturbing a first state of operation;
   b) suspending VLAN registration information in the one or more second bridges while the software upgrade is taking place;
   c) restoring the first state of the first bridge after the software upgrade has taken place; and
   d) sending notification to the one or more second bridges of the network that the software upgrade of the first bridge has been completed;

wherein the first bridge operates in a network containing a plurality of bridges and the first bridge and the one or more of the second bridges form part of a VLAN; and wherein the software upgrade provides enhanced bridge functions including one or more of assignment of port status, registering. deregistering and maintaining VLAN membership of the ports, and upgrading bridge programming.

2. The method of claim 1 wherein the step of sending notification further comprises the first bridge sending a GVRP message.

3. The method of claim 2 wherein the GVRP message uses a customizable attribute event under IEEE802.1D-1998.

4. The method of claim 1 wherein once the notification has been sent to one or more second bridges in the network, said one or more second bridges do not expect additional messages from the first bridge subsequent to notification.

5. The method of claim 1 where the step of suspending VLAN registration information comprises suspending the expiration of "Leave All" timers during the upgrading at the first bridge.

6. The method of claim 1 where the step of suspending VLAN registration information comprises suspending a predetermined period of time for removing VLAN registration membership until after the first bridge is upgraded.

7. The method of claim 1 wherein the step of restoring the first state of the first bridge further comprises synchronizing GVRP protocol to a VLAN registration table preserved in the first bridge during the upgrade.

8. The method of claim 7 wherein if a port of the first bridge is dynamically configured for a certain VLAN and is registered as a member of that VLAN, the synchronizing results in a corresponding Registrar state machine assuming an In (IN) state.

9. The method of claim 7 wherein if a port of the first bridge is dynamically configured for a certain VLAN and is not registered as a member of that VLAN, synchronizing results in a corresponding Registrar state machine assuming an Empty (MT) state.

10. The method of claim 7 wherein for a certain port and VLAN, the corresponding Applicant state machine assumes a Very Anxious Active Member state (VA), if at least one Registrar state machine for this VLAN associated to another active port of the same node is in an IN state.

11. The method of claim 7 wherein for a certain port and VLAN, the corresponding Applicant state machine assumes a Very Anxious Observer state (VO), if no Registrar state machine for this VLAN associated to another active port of the same node is in an IN state.

12. The method of claim 1 wherein the step of sending notification to one or more second bridges that the upgrading of the first bridge has been completed comprises sending a normal GVRP message to one or more frozen ports of said one or more second bridges.

13. The method of claim 12 wherein the GVRP message uses a customizable attribute event under IEEE802.1D-1998.

14. A computer readable medium containing a program which, when executed, performs a method for upgrading software in a control plane, the method comprising:
   a) sending notification to one or more second bridges that a first bridge is scheduled for a control plane software upgrade, thereby disturbing the first state of operation;
   b) suspending VLAN registration information in the one or more second bridges while the software upgrade is tacking place;
   c) restoring a state of the first bridge-after the software upgrade has taken place; and d) sending notification to the one or more second bridges of the network that the software upgrade of the first bridge has been completed;

wherein the first bridge operates in a network containing a plurality of bridges and the first bridge and the one or more of the second bridges form part of a VLAN; and wherein the software upgrade provides enhanced bridge functions including one or more of assignment of port status, registering, deregistering and maintaining VLAN membership of the ports, and upgrading bridge programming.

15. The computer readable medium of claim 14 wherein the step of sending notification further comprises the first bridge sending a GVRP message.

16. The computer readable medium of claim 15 wherein the GVRP message uses a customizable attribute event under IEEE802.1D-1998.

17. The computer readable medium of claim 14 wherein once the notification has been sent to one or more second bridges in the network, said one or more second bridges do not expect additional messages from the first bridge subsequent to notification.

18. The computer readable medium of claim 14 wherein the step of suspending VLAN registration information comprises suspending the expiration of "Leave All" timers during the upgrading of the first bridge.

19. The computer readable medium of claim 14 wherein the step of suspending VLAN registration information comprises suspending a predetermined period of time for removing VLAN registration membership until after the first bridge is upgraded.

20. The computer readable medium of claim 14 wherein the step of restoring the first state of the first bridge further comprises synchronizing GVRP protocol to a VLAN registration table preserved in the first bridge during the upgrade.

21. The computer readable medium of claim 20 wherein if a port of the first bridge is dynamically configured for a certain VLAN and is registered as a member of that VLAN, the synchronizing results in a corresponding Registrar state machine assuming an In (IN) state.

22. The computer readable medium of claim 20 wherein if a port of first bridge is dynamically configured for a certain VLAN and is not registered as a member of that VLAN, synchronizing results in a corresponding Registrar state machine assuming an Empty (MT) state.

23. The computer readable medium of claim 20 wherein for a certain port and VLAN, the corresponding Applicant state machine assumes a Very Anxious Active Member state, if at least one Registrar state machine for this VLAN associated to another active port of the same node is in an IN state.

24. The computer readable medium of claim 20 for a certain port and VLAN, the corresponding Applicant state machine assumes a Very Anxious Observer (VO) state, if no Registrar state machine for this VLAN associated to another active port of the same node is in an IN state.

25. The computer readable medium of claim 14 wherein the step of sending notification to one or more second bridges that the upgrading of the first bridge has been completed comprises sending a normal GVRP message to one or more frozen ports of said one or more second bridges.

26. The computer readable medium of claim 25 wherein the GVRP message uses a customizable attribute event under IEEE802.1D-1998.

27. A network bridge apparatus comprising:
a forwarding plane adapted to store VLAN membership information; and
a control plane, comprising a central processing unit, support circuits and memory, adapted for issuing and executing instructions that control upgrading of software of said network bridge apparatus according to said VLAN membership information including:
a) sending notification to one or more second bridges that the first bridge is scheduled for upgrading;
b) suspending VLAN registration information in the one or more second bridges while upgrading the first bridge;
c) restoring a state of file first bridge prior to it being updated; and
d) sending notification to the one or more second bridges of the network that the upgrading of the first bridge has been completed;
wherein the software upgrade provides enhanced bridge functions including one or more of assignment of port status, registering, deregistering and maintaining VLAN membership of the ports, and upgrading bridge programming.

28. The apparatus of claim 27 further comprising the step of restoring a state of the first bridge further comprises synchronizing GVRP protocol to a current VLAN membership tables.

* * * * *